United States Patent
Bristow et al.

(10) Patent No.: US 11,734,623 B2
(45) Date of Patent: Aug. 22, 2023

(54) FLEET SCHEDULER

(71) Applicant: Textron Innovations Inc., Providence, RI (US)

(72) Inventors: Grant Mark Bristow, Benbrook, TX (US); Matthew David Holvey, North Richland Hills, TX (US); Naveed Ahmed Siddiqui, Dallas, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 251 days.

(21) Appl. No.: 16/721,132

(22) Filed: Dec. 19, 2019

(65) Prior Publication Data

US 2021/0192405 A1 Jun. 24, 2021

(51) Int. Cl.
*G06Q 10/0631* (2023.01)
*G06N 20/00* (2019.01)

(52) U.S. Cl.
CPC ....... *G06Q 10/06311* (2013.01); *G06N 20/00* (2019.01)

(58) Field of Classification Search
CPC .................. G06Q 10/06311; G06N 20/00
See application file for complete search history.

(56) References Cited

U.S. PATENT DOCUMENTS

| | | | |
|---|---|---|---|
| 6,609,051 B2 * | 8/2003 | Fiechter | G05B 23/0243 714/E11.158 |
| 8,340,948 B1 * | 12/2012 | Song | G06Q 10/20 703/6 |
| 10,217,066 B1 * | 2/2019 | Margherio | E02F 9/267 |
| 10,692,053 B2 * | 6/2020 | Viswanath | G06F 16/245 |
| 10,956,855 B1 * | 3/2021 | Coughran | G06N 5/04 |
| 10,984,338 B2 * | 4/2021 | Morris, II | G06N 20/00 |
| 2008/0125933 A1 | 5/2008 | Williams et al. | |
| 2011/0029804 A1 * | 2/2011 | Hadden | G05D 1/0088 714/1 |
| 2014/0316616 A1 | 10/2014 | Kugelmass | |
| 2015/0234387 A1 | 8/2015 | Mullan et al. | |
| 2016/0147404 A1 * | 5/2016 | Keune | G09B 17/003 715/784 |
| 2016/0209220 A1 | 7/2016 | Laetz | |
| 2016/0247404 A1 | 8/2016 | Srivastava et al. | |
| 2016/0364989 A1 * | 12/2016 | Speasl | G08G 5/0082 |
| 2017/0166328 A1 * | 6/2017 | Ethington | G06Q 10/06311 |
| 2017/0168480 A1 | 6/2017 | Wanstedt et al. | |
| 2019/0130515 A1 * | 5/2019 | Haggiag | G01C 21/3484 |
| 2019/0188581 A1 * | 6/2019 | Chabin | G06Q 10/04 |
| 2019/0197798 A1 * | 6/2019 | Abari | G06Q 10/02 |

(Continued)

FOREIGN PATENT DOCUMENTS

| | | | | |
|---|---|---|---|---|
| WO | 2019089677 A1 | 5/2019 | | |
| WO | WO-2019143752 A1 * | 7/2019 | ........... | G05D 1/0291 |
| WO | WO-2020160778 A1 * | 8/2020 | ............ | G08G 1/202 |

*Primary Examiner* — Dylan C White
(74) *Attorney, Agent, or Firm* — Slater Matsil, LLP (57) ABSTRACT

In an embodiment, a fleet scheduler includes a processor; and a non-transitory computer-readable storage medium storing a program to be executed by the processor, the program including instructions for: gathering data representing real-world conditions; generating and maintaining predictive models based on the gathered data; and generating a master schedule for a plurality of vehicles based on the gathered data and the predictive models.

19 Claims, 6 Drawing Sheets

(56) References Cited

U.S. PATENT DOCUMENTS

| | | | |
|---|---|---|---|
| 2019/0220036 A1* | 7/2019 | Weslosky | G06Q 10/06 |
| 2019/0235488 A1* | 8/2019 | Beth | G08G 5/0043 |
| 2019/0339720 A1* | 11/2019 | Petersen | G08G 5/0013 |
| 2020/0075027 A1* | 3/2020 | Arantes | G10L 25/48 |
| 2020/0126326 A1* | 4/2020 | Lavie | G07C 5/008 |
| 2020/0372428 A1* | 11/2020 | Liu | G06N 3/08 |
| 2021/0192405 A1* | 6/2021 | Bristow | G08G 5/0069 |
| 2021/0192962 A1 | 6/2021 | Bristow et al. | |
| 2022/0114506 A1* | 4/2022 | Villa | G06Q 50/30 |
| 2022/0147897 A1* | 5/2022 | Liebman | G06Q 10/06375 |

\* cited by examiner

FLEET SCHEDULER

TECHNICAL FIELD

The present invention relates generally to fleet-level autonomous vehicle scheduling and, in particular embodiments, to a fleet scheduler which conducts fleet-level data monitoring, prediction, and scheduling to generate a master schedule for scheduling a fleet of autonomous vehicles.

BACKGROUND

Unmanned vehicles, such as unmanned aerial vehicles (UAVs), drones, and the like may be used for commercial endeavors, such as transportation and the like. Fleet-level scheduling and control systems may be used to optimize revenue generation and the like by a fleet of unmanned vehicles.

SUMMARY

In an embodiment, a fleet scheduler includes a processor; and a non-transitory computer-readable storage medium storing a program to be executed by the processor, the program including instructions for: gathering data representing real-world conditions; generating and maintaining predictive models based on the gathered data; and generating a master schedule for a plurality of vehicles based on the gathered data and the predictive models. In an embodiment, the master schedule includes schedules for positions, flight plans, maintenance, and servicing of the vehicles. In an embodiment, generating the master schedule includes establishing a mission to be completed; generating one or more flight plans to complete the mission; and selecting a preferred flight plan from the one or more flight plans. In an embodiment, the mission includes a priority, and generating the master schedule further includes ordering the mission according to the priority. In an embodiment, the program further includes instructions for updating the master schedule in real-time. In an embodiment, gathering the data representing real-world conditions includes gathering data from sensors on vehicle components indicating health statuses of the vehicle components, and generating the master schedule includes generating a maintenance schedule based on the health statuses of the vehicle components.

In accordance with another embodiment, a method for scheduling vehicles includes gathering data on real-world conditions to generate monitored data; predicting future real-world conditions to generate predicted data; generating a master schedule for scheduling vehicle operations based on the monitored data and the predicted data; and operating vehicles according to the master schedule. In an embodiment, the method further includes sending the master schedule to a fleet controller, the fleet controller controlling the operation of the vehicles according to the master schedule. In an embodiment, gathering data includes gathering demand data, operations data, environment data, external constrains, maintenance data, and vehicle data. In an embodiment, gathering data includes gathering data from sensors in the vehicles. In an embodiment, predicting the future real-world conditions includes predicting demand, fleet performance, and maintenance. In an embodiment, a goal-seeking algorithm generates the master schedule based on the monitored data, the predicted data, user-defined constraints, and user-defined parameters. In an embodiment, the goal-seeking algorithm moves from a deterministic model to a stochastic model as the monitored data and the predicted data are generated.

In accordance with yet another embodiment, a fleet management system includes a plurality of vehicles; a fleet scheduler, the fleet scheduler including a monitoring layer for gathering data representing real-world conditions; a prediction layer for generating and maintaining predictive models based on the real-world conditions; and a scheduling layer for generating a master schedule based on the real-world conditions and the predictive models; and a fleet controller for executing the master schedule by controlling movement of the plurality of vehicles. In an embodiment, the vehicles include unmanned aerial vehicles. In an embodiment, the vehicles include sensors for detecting health of components in the vehicles. In an embodiment, the master schedule includes schedules for positions of the vehicles, flights of the vehicles, and maintenance of the vehicles. In an embodiment, the monitoring layer is configured to communicate with an unmanned aircraft system traffic management program. In an embodiment, the scheduling layer updates the master schedule based on the real-world conditions and the predictive models in real-time. In an embodiment, the prediction layer is configured to predict demand, and the scheduling layer is configured to schedule the vehicles to move to staging locations based on the predicted demand.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The increasing availability of electric-powered vehicles and improved remote vehicle control capabilities have recently led to increasing use of autonomous vehicles and development of autonomous vehicle fleets. The cost and complexity of autonomous vehicles, coupled with the increasing size of vehicle fleets calls for centralized fleet management systems. Embodiments of a fleet management system are described herein, with the fleet management system providing control and monitoring of autonomous vehicles to optimize the effective use of the vehicles, while maintaining safety and maintenance standards. While some embodiments of the fleet management system are described as being directed to control and monitoring of flying vehicles, such as drones, aircraft, rotorcraft, or the like, it should be understood that the principles described herein are equally applicable to watercraft, ground vehicles, or mixed fleets including any number or combination of flying vehicles, ground vehicles, and watercraft.

In some embodiments, the fleet management system provides a persistent connection with each vehicle, which may include real-time, near real-time, or last known statuses of vehicles. The fleet management system may permit a user to control vehicles from various interaction mediums such as tablets, augmented reality (AR) headsets, laptops, desktops, control centers, or the like.

Some embodiments of the fleet management system permit assignment of role-based access for command and control of vehicles to segregate users into various roles and allow management of user and user access to vehicles controlled by the fleet management system. The fleet management system may also use a control arbitrator to ensure a single point of control of a vehicle at any one time to prevent contradictory command or control from different users.

In some embodiments, the fleet management system provides for tracking, monitoring and management at the device level, with individual components on each vehicle being tracked and monitored to provide for part localization, tracking of component location (such as in vehicle, in repair, or the like), protection against fraudulent or counterfeit parts, lifecycle management of individual parts, or the like. These individual components may be connected components that self-identify on the vehicle and use the vehicle datalink to send component telemetry. In some embodiments, each of the connected components may include a unique device identity, which may be represented by an on-device certificate, such as an X.509 public key certificate or the like. The tracking of individual connected components and the reporting of connected component telemetry to the fleet management system permits the tracking of complete component histories for the lifetimes of each of the connected components, which may be made available via a cloud data storage system as a cloud-based component logbook.

Additionally, the tracking of individual connected components may include storing device performance, use or maintenance history, and the like for use by prediction services such as a fleet scheduler, active connected component health monitoring, predictive maintenance, and the like. Tracking the histories of the connected components and having access to the connected component histories further permits software/firmware updates and the deployment of component-level systems.

Figure 1:
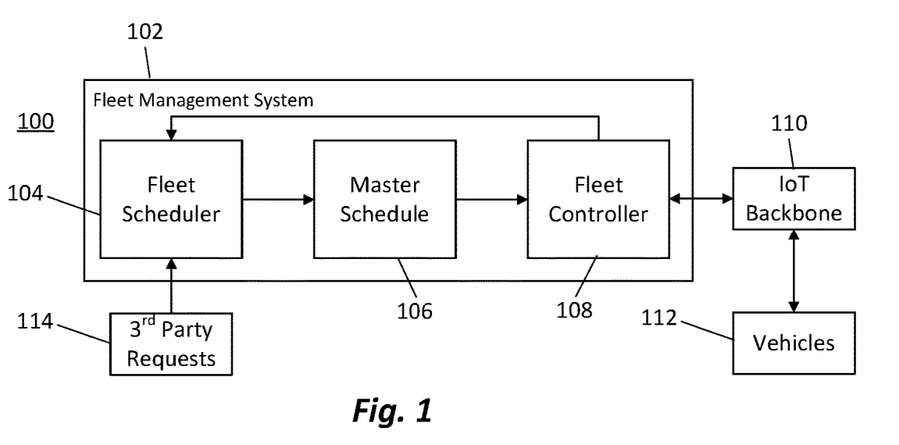
FIG. 1 illustrates a fleet management system, in accordance with an embodiment.

FIG. 1 illustrates an arrangement 100 of a fleet management system 102 for command and monitoring of one or more vehicles 112 according to some embodiments. The fleet management system 102 is a system for launching and sustaining continuous operations for fleets of autonomous vehicles. The fleet management system 102 may include a fleet scheduler 104 that generates, or submits entries to, a master schedule 106. The master schedule 106 is used by a fleet controller 108 to control one or more vehicles through an internet-of-things (IoT) backbone no. The vehicles 112 may feed operational data back to the fleet controller 108 through the IoT backbone no, which then reports the operational data back to the fleet scheduler 104, or otherwise makes the operational data available to the fleet scheduler 104.

The fleet scheduler 104 monitors real-world data, including the operational data, generates future-state predictions based on that data, and produces the optimized master schedule 106, which may include vehicle positions, flight plans, maintenance and service (such as vehicle recharge/refuel) schedules, and the like for fleet operations.

Additionally, the fleet scheduler 104 may include an application programming interface (API) or other system for permitting third parties to submit third party entries or requests to the master schedule 106, for requesting scheduling by the fleet scheduler 104, or the like. In some embodiments, the third party requests 114 may be submitted directly to the master schedule 106, or may be submitted to the fleet scheduler 104 for verification or scheduling. For example, a third party cargo carrier may submit a request to the fleet scheduler 104 for carrying a particular class of cargo at a particular time and location, the fleet scheduler 104 may determine a vehicle 112 suitable for the requested mission, the fleet scheduler 104 may assign the mission to the vehicle 112, and the fleet scheduler 104 may submit the scheduled mission to the master schedule 106. In other embodiments, a third party may perform the mission generation and scheduling, and submit a mission entry to the master schedule 106 for execution by the fleet controller 108.

In some embodiments, the fleet scheduler 104 analyzes historical demand, such as payload or passenger movement between identified points, demand input such as manual user entry or integration with planning systems, and environmental data such as weather, public transit, or ground traffic, and outputs recommendations for aircraft placement across a region's nodes in anticipation of upcoming demand. This predictive modeling allows for anticipatory vehicle placement to handle future demand, avoiding the need to assign vehicles fixed, regular routes, which require a fixed schedule with a fixed number of vehicles. Such anticipatory positioning may also permit vehicles to be automatically prepositioned before an actual demand exists, rather than tasking vehicles to a particular site or assignment after demand occurs.

In some embodiments, the fleet scheduler 104 also monitors health characteristics of vehicle systems that are known to be associated with component degradation by analyzing real-time on-board sensor data in the operational data sent from the individual vehicles. The fleet scheduler 104 may apply machine learning to predict when the system or component is likely to fail. In such an embodiment, the fleet scheduler 104 uses predicted failure insights to determine when the vehicle 112 should be scheduled for maintenance or inspection in coordination with regular mission operations. Using data from operational vehicles permits the fleet scheduler 104 to correlate maintenance requirements for components/systems that follow similar maintenance cycles. This permits sequencing of aircraft maintenance downtime according to a predicted maintenance or servicing need at the fleet level, and the staggering or sequencing of scheduled maintenance activities ensures the fleet remains available to carry out daily mission operations.

The fleet controller 108 executes the master schedule 106, while also monitoring real-time air and ground conditions. The fleet controller 108 observes vehicles 112 of the fleet, weather conditions, and other operating factors, and will delay, redirect, or otherwise modify commands to the vehicles 112 if executing the master schedule 106 would result in unsafe or undesirable conditions. The fleet controller 108 executes the master schedule 106 by maintaining communication with the vehicles 112, monitoring the vehicles 112 in real-time or near real-time, and sending command instructions to the vehicles 112. The fleet controller 108 monitors real-time or near real-time fleet information regarding vehicle state, performance and health, progress of each flight, and the state of each verti-port or ground location. The fleet controller 108 looks for conflicts during vehicle operations that result in unsafe or undesirable conditions and deviates from the master schedule 106 as necessary to enact contingencies that ensure safe and desirable fleet operations. In this way, the fleet controller 108 works independently from the fleet scheduler 104 to ensure a second layer of safe operations.

Figure 2:
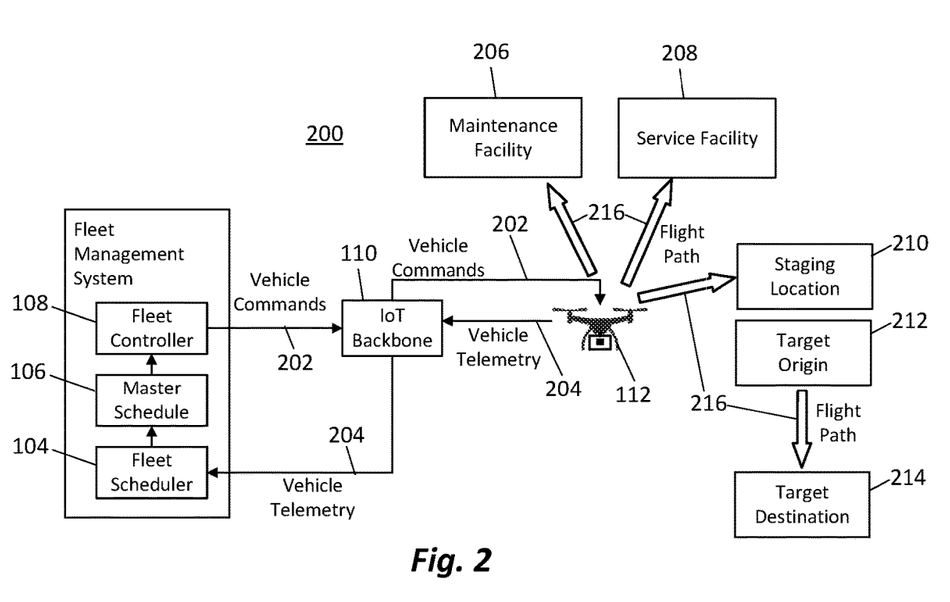
FIG. 2 illustrates operation of the fleet management system, in accordance with an embodiment.

FIG. 2 illustrates operation of a fleet management system 102 for control and monitoring of one or more vehicles 112 according to an embodiment. The fleet management system 102 is in communication with one or more vehicles 112 via the IoT backbone 110. In some embodiments, the fleet scheduler 104 generates the master schedule 106 and the fleet controller 108 uses entries in the master schedule 106 to generate vehicle commands 202 which are sent to the vehicles 112. In some embodiments, the vehicle commands 202 are commands to follow a particular flight path 216 to a destination, such as a maintenance facility 206, a service facility 208, a staging location 210 or a target origin 212, or for a mission between a target origin 212 and a target destination 214. For example, the fleet scheduler 104 may determine that a particular vehicle 112 has components in need of inspection or replacement, and may route the respective vehicle 112 to a maintenance facility 206. Similarly, the fleet scheduler 104 may determine from vehicle telemetry 204, or other data, that a battery of a vehicle 112 needs to be charged, that the vehicle 112 needs fuel, or the like, and may route the respective vehicle 112 to a service facility 208 or the like.

The fleet scheduler 104 may also provide entries in the master schedule 106 for missions such as passenger carriage, package or cargo pickup and delivery, and the like. In some embodiments, the fleet scheduler 104 may use predictive analytics to determine where potential demand exists. The fleet scheduler 104 may stage vehicles 112 at staging locations 210 associated with target origins 212 for missions between the target origins 212 and target destinations 214, or between the target origins 212 and destinations which are not yet determined at the time of predicted demand. For example, the fleet scheduler 104 may use a transit schedule, such as a train schedule, to predict that demand for passenger carriage or taxi service will peak shortly after a train arrives at a train station, and may send vehicles 112 to a staging location 210 near the train station, with the train station being a target origin 212 for a potential passenger carriage mission. Thus, the fleet scheduler 104 may be able to have vehicles 112 ready to accept passengers with reduced passenger wait times. The fleet scheduler 104 may also use a weather service or weather forecast to predict that adverse weather conditions will increase demand for passenger carriage service at the train station, and may task additional vehicles 112 to the staging location 210 prior to a train's arrival to handle the anticipated increased passenger carriage mission demand. In such situations, the target destination 214 may be input by a passenger after the passenger requests carriage, or after the passenger enters the vehicle 112. The fleet scheduler 104 may receive a request for a passenger carriage mission, may determine one or more vehicles 112 closest to the passenger's target origin 212, and may provide an entry in the master schedule 106 assigning the vehicle 112 to the passenger carriage mission at the target origin 212.

Similarly, cargo handling may be scheduled by the fleet scheduler 104, with cargo vehicles 112 being sent to staging locations 210 near post offices, warehouses, distribution points, or the like according to predicted demand. The fleet scheduler 104 may be tied into data inputs such as retailers, distributors, package delivery logistic systems, third party request or scheduling systems, cargo terminal systems, or the like, and may use the data inputs, solely or in combination with, environmental monitoring, historical data, and the like to determine predicted and or actual package delivery demand. For example, cargo vehicles 112 may be staged near restaurants near meal times to handle food deliveries without requiring that the vehicles 112 be routed to the pickup point after the cargo mission is requested. In another example, cargo vehicles 112 may be sent to staging locations 210 near retail warehouses, package delivery hubs, or the like, to handle delivery of cargo or packages, with the number of vehicles 112, staging locations 210 and arrival times determined by the fleet scheduler 104 according to anticipated and/or actual demand.

Figure 3A:
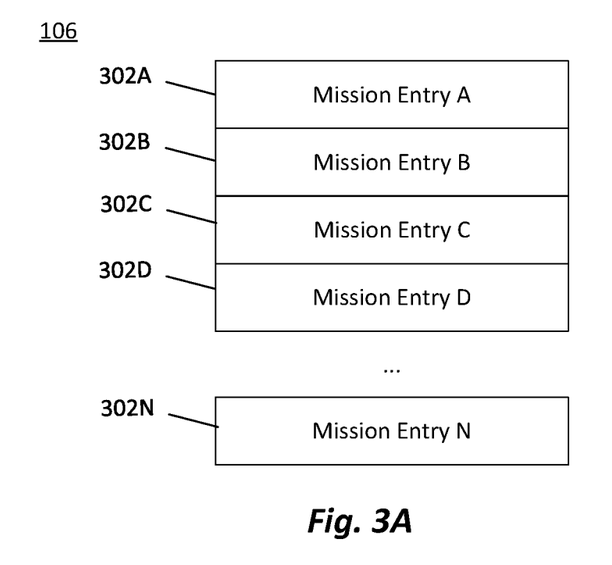
FIGS. 3A and 3B illustrate a master schedule and a mission entry in the master schedule, respectively, in accordance with an embodiment.
Figure 3B:
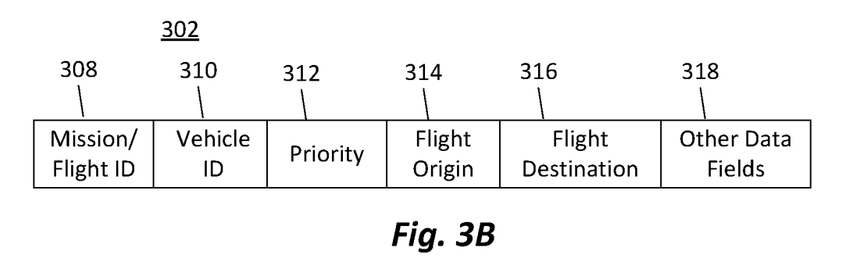

FIG. 3A illustrates an embodiment of a master schedule 106. FIG. 3B illustrates an embodiment of a mission entry 302 in the master schedule 106. The master schedule 106 may have one or more mission entries 302A ... 302N set by the fleet scheduler 104. Each mission entry 302 may include data fields such as a mission identifier (ID) field 308, a vehicle ID field 310, a priority field 312, a flight origin field 314, a flight destination field 316, and one or more other data fields 318. The mission ID field 308 may uniquely identify a specific mission which is stored in the master schedule 106. The vehicle ID field 310 identifies a specific vehicle which will perform the specific mission. The vehicle ID field 310 may uniquely identify the specific vehicle 112 to allow the fleet controller 108 to control the specific vehicle 112 and permit the fleet scheduler 104 to track usage and anticipated location of the specific vehicle 112.

The priority field 312 may include data identifying a priority of the mission, and may include a numerical value identifying the priority of the mission so that the fleet controller 108 handles mission entries 302 in the priority order. In some embodiments, the priority field 312 may indicate that the mission is an immediate mission instructing the fleet controller 108 to handle the mission entry 302 with the highest priority or immediately.

The mission entry 302 may also have locations in the flight origin field 314 identifying where the vehicle 112 should be sent for the mission. In some embodiments, the flight destination field 316 may also have a location for the end location of the mission. However, in further embodiments, the flight destination field 316 may be left blank at the beginning of the mission. Leaving the flight destination field 316 blank may indicate that the mission route or destination is to be determined on-the-fly. For example, in a passenger carriage mission, a passenger may identify a destination after the mission is scheduled, or after the mission begins. The mission entry 302 may also include other data fields 318 with maybe used for supplemental data, or additional mission data such as data identifying mission start or end time, a particular flight route, account number for a particular mission, a mission identifier, requirements for the mission, or the like.

Figure 4:
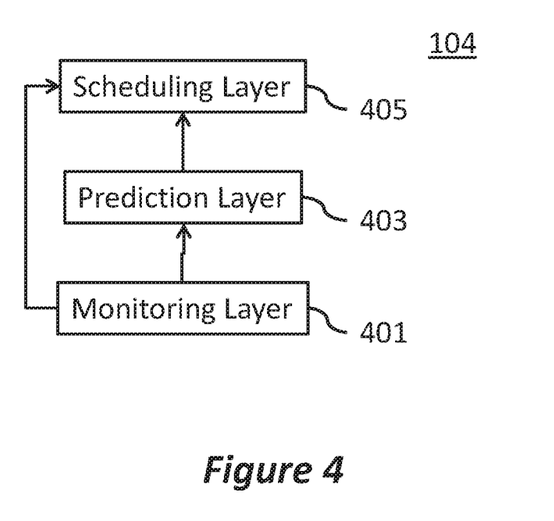
FIG. 4 illustrates an architecture for a fleet scheduler, in accordance with an embodiment.

FIG. 4 illustrates an architecture of the fleet scheduler 104, in accordance with some embodiments. As illustrated in FIG. 4, the fleet scheduler 104 includes a monitoring layer 401, a prediction layer 403, and a scheduling layer 405. The monitoring layer 401 gathers data relevant to scheduling the vehicles 112 from data sources and generates monitored data. The monitored data may represent external real-world conditions. The prediction layer 403 uses the monitored data from the monitoring layer 401 to generate and maintain predictive models, which are used to forecast future conditions. The prediction layer 403 uses the predictive models to generate predicted data. The scheduling layer 405 uses the monitored data from the monitoring layer 401 and the predicted data from the prediction layer 403 to generate the master schedule 106, which is used to schedule positions, flight plans, maintenance schedules, refueling/recharging, and the like for the vehicles 112. The monitored data, the predicted data, and the master schedule 106 may be stored in cloud-based storage, edge-based storage, a data lake, or any other suitable type of storage location. The master schedule 106 may also be sent to the fleet controller 108.

Figure 5:
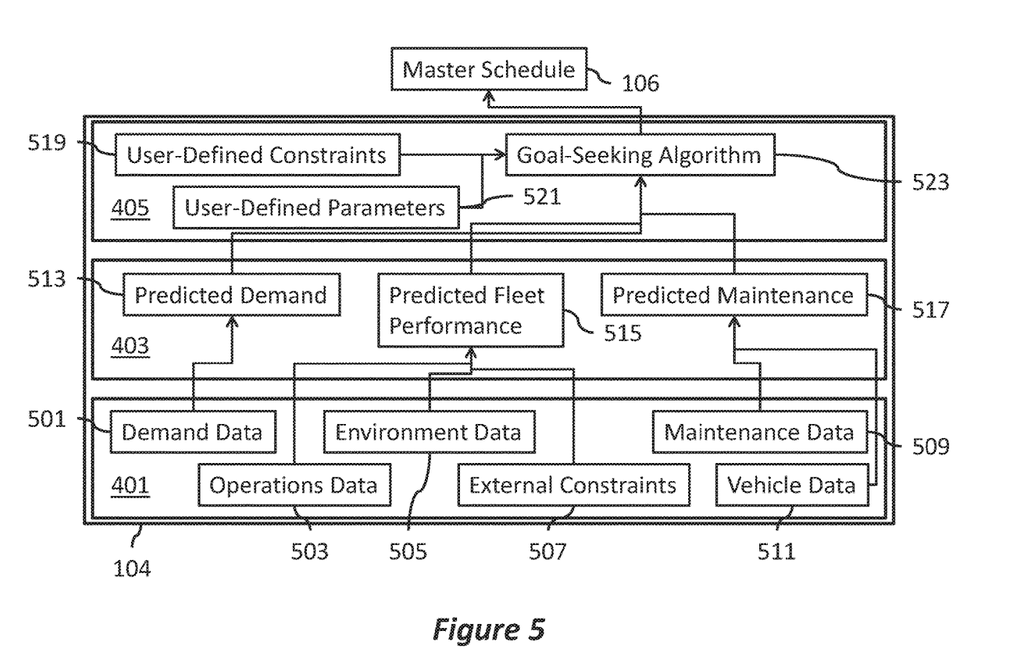
FIG. 5 illustrates an architecture for a fleet scheduler, in accordance with an embodiment.

FIG. 5 illustrates additional details for the architecture of the fleet scheduler 104, in accordance with some embodiments. As illustrated in FIG. 5, the monitoring layer 401 may gather demand data 501, operations data 503, environment data 505, external constraints 507, maintenance data 509, and vehicle data 511 to generate the monitored data.

The demand data 501 may be collected from user inputs, third party systems, and the like. For example, users may schedule transportation of a payload or passenger from one location to another location through a booking application or the like. The booking application may interface directly with the monitoring layer 401, or may be part of a third party system which interfaces with the monitoring layer 401. In addition to actual demand requests, the demand data 501 may also include data relevant to potential demand, such as transportation schedules (e.g., bus schedules, train schedules, airline flight schedules, and the like), web search data (e.g., map application searches and the like), and any other data relevant to the predicting vehicle demand.

The operations data 503 is collected from the vehicles 112 based on actual flight performance. The operations data 503 may include data related to flight times, such as flight start location, flight end location, flight duration history, vehicle locations, flight plans, deviations to flight plans, loading times for payloads, predicted flight times compared with actual flight times, numbers of on-time, early, and delayed flights, and the like. The operations data 503 may further include relevant data to vehicle performance, such as start and end vehicle energy levels, predicted energy expenditures compared with actual energy expenditures, wear on vehicle components caused by flights, and the like. The operations data 503 may include any vehicle-specific data relevant to predicting time requirements, energy requirements, and the like for a given flight.

The environment data 505 may be collected from weather sensors, sensors on the vehicles 112, sensors at vertiports or staging locations, and third party sources. The environment data 505 may include data related to current environmental conditions. For example, the environment data 505 may include current and predicted temperature, air density, wind direction and speed, and the like. The environment data 505 may include data for a variety of altitudes. The environment data 505 may further include data related to the time of day. The environment data 505 may include any data on environmental conditions relevant to predicting time requirements, energy requirements, and the like for a given flight.

The external constraints 507 may include physical constraints, regulatory constraints, and the like. Physical constraints may include structures (e.g., buildings, bridges, telephone lines, and the like), geography (e.g., mountains, hills, trees, and the like), and the like. Regulatory constraints may include compliance with a UAF (unmanned aircraft systems) traffic management (UTM) program, restricted and allowed airspaces, and the like. A UTM program may be used to provide approved flight corridors, check for restricted airspaces, perform de-confliction between the vehicles 112 scheduled by the fleet scheduler 104 and outside vehicles, and the like. Data from the UTM program is included in the external constraints 507. The external constraints 507 may include any data that affects routes of flight plans generated by the fleet scheduler 104.

The maintenance data 509 may include data on maintenance performed on the vehicles 112, routine maintenance requirements, and the like. Routine maintenance may need to be performed at regular time intervals or after components have logged prescribed flight hours. The maintenance data 509 may include cycle times for performing maintenance work orders, cycle times between required maintenance, cycle times for technicians performing work orders, numbers and identities of available technicians, available replacement components, and the like. The maintenance data 509 may include any data relevant to regularly scheduled maintenance performed on the vehicles 112.

The vehicle data 511 may include data specific to each of the vehicles 112. As will be discussed in greater detail below with respect to FIG. 6, the vehicles 112 may include one or more connected components (such as the connected components 603, discussed in reference to FIG. 6), which each include one or more sensors (such as the sensors 605, discussed in references to FIG. 6). The vehicle data 511 may include which connected components are installed in each of the vehicles 112, payload capacities for the vehicles 112, data collected from the sensors in the vehicles 112 (e.g., connected component wear data and the like), and the like. The vehicle data 511 may include any data related to specific vehicles 112.

The monitored data (including the demand data 501, the operations data 503, the environment data 505, the external constraints 507, the maintenance data 509, and the vehicle data 511) may be stored in digital logbooks. The monitored data may be analyzed for anomaly detection before the monitored data is stored in the digital logbooks. For example, if a connected component is reported as being installed in two vehicles 112, this data may be checked to verify which of the vehicles 112 the component is installed in before the data is stored in the digital logbooks. This ensures that the data stored in the digital logbooks is accurate.

The prediction layer 403 may generate predicted demand 513, predicted fleet performance 515, and predicted maintenance 517 to generate the predicted data. The prediction layer 403 may use the demand data 501 to generate the predicted demand 513. The prediction layer 403 may use the operations data 503, the environment data 505, and the external constraints 507 to generate the predicted fleet performance 515. The prediction layer 403 may use the maintenance data 509 and the vehicle data 511 to generate the predicted maintenance 517. There may be additional correlations which may be used by the prediction layer 403. For instance, the environment data 505 and the external constraints 507 may be relevant to the predicted demand 513 and the vehicle data 511 may be relevant to the predicted fleet performance 515. The predictive models used to generate the predicted data may be constantly updated based on new monitored data received by the prediction layer 403.

The scheduling layer 405 may include user-defined constraints 519, user-defined parameters 521, and a goal-seeking algorithm 523. The monitored data (e.g., the demand data 501, the operations data 503, the environment data 505, the external constraints 507, the maintenance data 509, and the vehicle data 511), the predicted data (e.g., the predicted demand 513, the predicted fleet performance 515, and the predicted maintenance), the user-defined constraints 519, and the user-defined parameters 521 may be input into the goal-seeking algorithm, which may then generate and update the master schedule 106.

The user-defined constraints 519 may include constraints such as total number of vehicles 112, minimum number of active vehicles 112 (e.g., vehicles 112 ready for flight or in-flight), maximum wait times (e.g., maximum passenger wait times, maximum delivery wait times, and the like), minimum surplus energy requirements to complete flights, and the like. The user-defined parameters 521 may include a data set used by the goal-seeking algorithm at startup before the monitoring layer 401 and the prediction layer 403 have populated the monitored data and the predicted data, respectively. The user-defined parameters 521 may further include parameters used to weight functions optimized by the goal-seeking algorithm 523. In an example, revenue generation may be the main goal for the fleet scheduler 104. A user may include user-defined parameters 521 which cause the goal-seeking algorithm 523 to generate the master schedule 106 which optimizes revenue generation. Users may desire the flight scheduler to meet a variety of goals, therefore the user-defined parameters 521 may be used to weight each of these goals in the goal-seeking algorithm.

Upon startup, the monitored data and the predicted data may be unpopulated. As such, the goal-seeking algorithm 523 may use pre-defined decision trees created by the user in order to generate the master schedule 106. The decision trees may be deterministic in that randomness is not taken into account in generating the master schedule 106. To generate the master schedule 106, the goal-seeking algorithm 523 may analyze a number of possible decisions and select the best one based on the goals the goal-seeking algorithm 523 is programmed to optimize for. As the monitored data and the predicted data are populated, the goal-seeking algorithm 523 may use machine learning (ML) and artificial intelligence (AI) to create stochastic models, which take real-world randomness into account. As such, the master schedule 106 will become increasingly accurate and will improve over time as more data is populated into the monitored data and the predicted data.

The master schedule 106 may include vehicle positions, flight schedules, maintenance schedules, recharging/refueling schedules, and the like. Entries for flights in the master schedule 106 may include a start location, an end location, a flight path, any stops along the flight path, expected duration for flights, expected energy expenditure, and the like. Specifically, the master schedule 106 may output recommendations for vehicle placement in anticipation for upcoming demand. The master schedule 106 may provide maintenance schedules which intelligently sequence vehicle maintenance downtime so that a limited number of the vehicles 112 are down at any given time and downtime is scheduled in times of low demand.

In generating the master schedule 106, the fleet scheduler 104 may perform predictive de-confliction of the vehicles 112 within the fleet by scheduling the vehicles 112 to avoid having overlapping flight paths. The master schedule 106 may interface with the UTM program in order to actively de-conflict the vehicles 112 and outside vehicles. This prevents the vehicles 112 from colliding with other vehicles 112 or outside vehicles.

The fleet scheduler 104 may allow for manual addition or removal of entries into the master schedule 106 by authorized users or manual control of the vehicles 112. In cases where manual entries are made, the fleet scheduler 104 revises other entries in the master schedule 106 to reflect the manual entries. In cases where manual control is taken over one or more of the vehicles 112, the fleet scheduler 104 may remove the vehicles 112 from the master schedule 106 until the vehicles 112 are released from manual control and update the master schedule 106 accordingly.

The master schedule 106 may use a priority-based queue. For example, time-sensitive services, such as emergency services (e.g., delivery of medical supplies, transport of patients, or the like) may have higher priorities than services which are not time-sensitive, such as regular deliveries and the like. Authorized users, including third-party users, may be able to set the priority level for entries into the master schedule 106. For example, health providers may have the ability to request delivery services with top priority from the fleet scheduler 104.

Data from the fleet scheduler 104 may be stored in physical servers, edge servers, cloud servers, and the like and may also be sent to third parties. Third parties may use data provided from the fleet scheduler 104 to provide estimated delivery times, estimated transport times, and the like to customers and potential customers.

Figure 6:
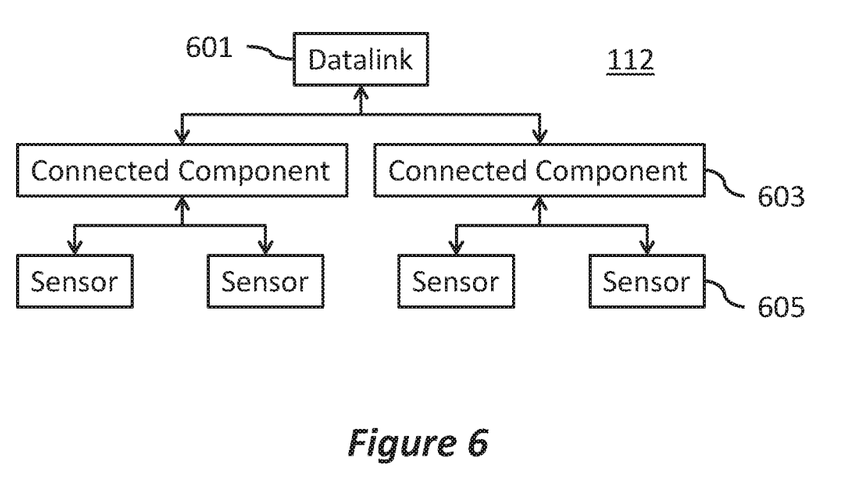
FIG. 6 illustrates a vehicle, in accordance with an embodiment.

FIG. 6 illustrates a vehicle 112 which may be scheduled by the fleet scheduler 104 and controlled by the fleet controller 108. The vehicle 112 includes a datalink 601, one or more connected components 603 connected to the datalink 601, and one or more sensors 605 included in the connected components 603. The connected components 603 may be connected to the datalink 601 through wired or wireless connections. In some embodiments, the connected components 603 may be powered by wired powerlines and be connected to the datalink 601 through wired connections. In further embodiments, the connected components 603 may be powered by batteries and be connected to the datalink 601 through wireless connections.

The datalink 601 may be used to send data (e.g., vehicle data 511) from the vehicle 112 to the fleet scheduler 104, the fleet controller 108, cloud-based storage, edge-based storage, a data lake, an Internet of Things (IoT) hub, or any other suitable type of storage location. The fleet scheduler 104 may receive vehicle data 511 sent from the datalink 601 directly from the datalink 601, through the fleet controller 108, through any external storage locations, or the like, which store data for a given vehicle 112.

The connected components 603 may include components such as motors, rotors, batteries, landing gear, a frame, payload securing components, payload delivery components, and the like. The sensors 605 may be included in the connected components 603 to monitor the health of the connected components 603. For example, health data of the connected components 603 may be monitored by the sensors 605, which is forwarded to the fleet scheduler 104 through the datalink 601, such that the fleet scheduler 104 schedules maintenance for the connected components 603 appropriately.

Each of the connected components 603 may include a unique device identifier (ID). The datalink 601 may transmit data as to which device ID's are currently installed in the vehicle 112 such that the location of the connected components 603 is constantly tracked. Utilizing the unique ID's for the connected components 603 in the vehicles 112 may be beneficial in protecting against fraudulent, counterfeit, and faulty components, in addition to tracking wear, maintenance, and the like for the connected components 603.

The elements of the fleet scheduler 104 may, in some embodiments, be implemented by a computer system. The computer system may have one or more processors and a non-transitory computer readable medium having a program stored thereon. The program may include instructions for performing the processes described herein. Additionally, one or more elements of the fleet scheduler 104 may be implemented as separate processes, programs or portions of one or more programs, or as separate programs on a computer or computer system having multiple computers. The monitoring layer 401, the prediction layer 403, and the scheduling layer 405 may be disposed on the same computer system, network, or program, or may be implemented by separate computer systems, networks, or programs. Additionally, the fleet scheduler 104 and the fleet controller 108 may be integrated together in a same computer system in separate programs or processes, or in separate computer systems or networks.

Figure 7:
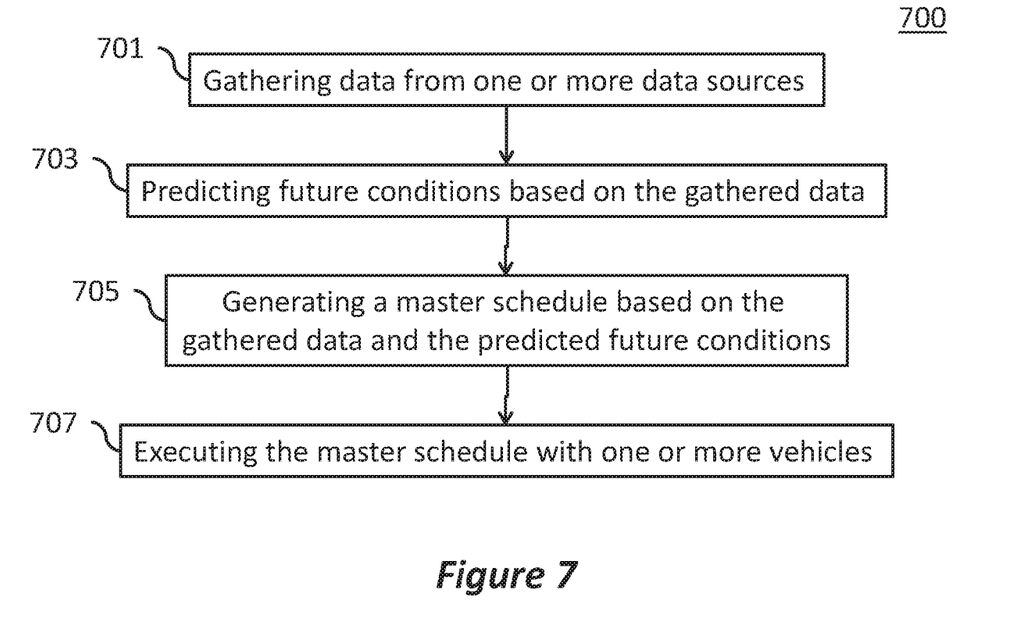
FIG. 7 illustrates a method of scheduling and controlling vehicles, in accordance with an embodiment.

FIG. 7 illustrates a method 700 of controlling vehicles 112 with the fleet scheduler 104. The method 700 includes step 701 wherein data is gathered from one or more data sources, step 703 wherein future conditions are predicted based on the gathered data, step 705 wherein the master schedule 106 is generated based on the gathered data and the predicted future conditions, and step 707 wherein the one or more vehicles 112 execute the master schedule 106.

In step 701, data is gathered from a plurality of data sources, which may include the demand data 501, the operations data 503, the environment data 505, the external constraints 507, the maintenance data 509, and the vehicle data 511. The data may be gathered by the monitoring layer 401. The data gathered in step 701 may be stored in a format and location which allow for analysis in step 703. In some embodiments, the data gathered in step 701 may be stored in cloud-based storage, edge-based storage, a data lake, or any other suitable type of storage location.

In step 703, the data gathered in step 701 is analyzed and used to predict future conditions. The future conditions may include the predicted demand 513, the predicted fleet performance 515, and the predicted maintenance 517. The future conditions may be predicted by the prediction layer 403 of the fleet scheduler 104. The prediction layer 403 generates predictive models based on the gathered data and constantly updates and maintains the predictive models based on new data that is gathered in step 701. The prediction layer 403 then uses the predictive models to predict the future conditions.

The prediction layer 403 may generate the predicted demand 513 based on the demand data 501, the environment data 505, and any other relevant data. The demand data 501 may include direct demand, such as user requests for transportation and the like, and indirect demand, such as historical demand, web search history, transportation schedules, and the like. The prediction layer 403 may set a baseline for the predicted demand 513 based on the direct demand, and increase the predicted demand 513 based on the indirect demand and the environment data 505. The predicted demand 513 may be increased based on indirect demand data such as high historical demand on certain days or times (e.g., high traffic volume near the holidays, near lunch-time, near rush-hour, and the like); high demand related to transportation schedules (e.g., high traffic volume near bus or train stops according to transportation schedule and the like); high demand associated with web search volume; and the like. The predicted demand 513 may also be increased based on current and predicted weather. For example, the predicted demand 513 may be high when the weather forecast is mild, inclement, or the like.

The prediction layer 403 may generate the predicted fleet performance 515 based on the operations data 503, the environment data 505, the external constraints 507, the vehicle data 511, and any other relevant data. The prediction layer 403 may generate an estimate on the predicted fleet performance 515 based on the operations data 503 and may update the estimate based on the external constraints 507 the environment data 505 and the vehicle data 511. The operations data 503 may be used to predict estimated energy requirements for a flight, travel time to the start location, travel time for the flight, loading time, and the like.

The external constraints 507 may determine which flight paths can be used for any given flight. The fleet scheduler 104 may communicate with a UTM program in order to determine what flight paths are available or restricted and to ensure that a selected flight path complies with the UTM program. The prediction layer 403 may use the environment data 505 to update the predicted fleet performance 515 based on wind speed, wind direction, air density, temperature, air pressure, and the like. The vehicle data 511 may be used to predict the performance of each of the vehicles 112. For example, sensors on a vehicle 112 may indicate that the vehicle is operating less than optimally, and the predicted performance of that vehicle may be updated in the predicted fleet performance accordingly.

The prediction layer 403 may generate the predicted maintenance 517 based on the maintenance data 509, the vehicle data 511, and any other relevant data. The prediction layer 403 may generate an estimate on the predicted maintenance 517 based on the maintenance data 509 and may update the estimate based on the vehicle data 511. For example, the predicted maintenance 517 may include regular maintenance schedules based on the maintenance data 509. The maintenance schedules may be updated based on the vehicle data 511 collected from specific vehicles 112. For example, if a sensor 605 on a vehicle 112 indicates that a component is faulty, the maintenance schedules may be updated accordingly. Alternatively, if maintenance is scheduled for a component on a vehicle 112, but a sensor 605 indicates that the component is functioning correctly, the maintenance may be delayed.

In step 705, the master schedule 106 is generated by the scheduling layer 405 based on the data gathered by the monitoring layer 401 in step 701 and the predicted future conditions predicted by the prediction layer 403 in step 703. User-defined constraints 519, user-defined parameters 521, the gathered data, and the predicted future conditions may be input into a goal-seeking algorithm 523, which may be used to generate the master schedule 106.

The user-defined constraints 519 may include things such as total number of vehicles 112, minimum number of active vehicles 112, maximum wait times, minimum energy requirements, and the like. The user-defined parameters 521 may include initial data sets used to populate the goal-seeking algorithm 523 and parameters used by the goal-seeking algorithm 523 in optimizing the master schedule 106. The parameters may be used to weight various goals in the goal-seeking algorithm, such as revenue generation, wait times, number of flights completed, customer satisfaction, revenue margin-per-flight, and the like.

Upon startup of the fleet scheduler 104, the monitoring layer 401 and the prediction layer 403 have not had time to gather and analyze data. As such, the goal-seeking algorithm 523 may generate the master schedule 106 based largely on user-generated pre-determined decision trees, which may be included in the user-defined constraints 519 and the user-defined parameters 521. The decision trees may be deterministic and may not take randomness into account in generating the master schedule 106. As the monitoring layer 401 gathers more data, the prediction layer 403 will have more data available to it, and the prediction of future conditions by the prediction layer 403 more accurately take real-world conditions into account to provide better predictions. The prediction layer 403 and the goal-seeking algorithm 523 of the scheduling layer 405 may use ML and AI to improve the predicted future conditions predicted by the prediction layer 403 and to optimize the master schedule 106 generated by the scheduling layer 405. As the scheduling layer 405 takes more real-world randomness into account, the goal-seeking algorithm 523 moves from a deterministic model, to a stochastic model.

In specific embodiments, the goal-seeking algorithm 523 may establish a plurality of missions to be completed by the vehicles 112 based on the demand data 501 and the predicted demand 513. The goal-seeking algorithm 523 may generate a plurality of potential flight plans which could be used to complete each of the missions. The goal-seeking algorithm 523 may then select the flight plan which optimally completes each of the missions, based on the user-defined constraints 519, the user-defined parameters 521, the predicted data, and the monitored data.

The master schedule 106 may include positions for the vehicles 112, flight plans, maintenance schedules, service schedules (e.g., schedules for refueling, recharging, and the like), flight times, energy expenditures, and the like. Once the master schedule 106 is generated, the master schedule 106 may be used to control the vehicles 112. In some embodiments, the master schedule 106 may be sent to the fleet controller 108. The fleet controller 108 controls the vehicles 112 to execute the master schedule 106. Both the fleet controller 108 and the vehicles 112 may have the ability to deviate from the master schedule 106. For example, the vehicles 112 may include obstacle avoidance technology and the fleet controller 108 may communicate with the UTM program to provide real-time de-confliction with third parties. Any data related to deviations from the master schedule may be sent to the fleet scheduler 104 and the master schedule 106 may be updated accordingly.

In an embodiment, a fleet scheduler includes a processor; and a non-transitory computer-readable storage medium storing a program to be executed by the processor, the program including instructions for: gathering data representing real-world conditions; generating and maintaining predictive models based on the gathered data; and generating a master schedule for a plurality of vehicles based on the gathered data and the predictive models. In an embodiment, the master schedule includes schedules for positions, flight plans, maintenance, and servicing of the vehicles. In an embodiment, generating the master schedule includes establishing a mission to be completed; generating one or more flight plans to complete the mission; and selecting a preferred flight plan from the one or more flight plans. In an embodiment, the mission includes a priority, and generating the master schedule further includes ordering the mission according to the priority. In an embodiment, the program further includes instructions for updating the master schedule in real-time. In an embodiment, gathering the data representing real-world conditions includes gathering data from sensors on vehicle components indicating health statuses of the vehicle components, and generating the master schedule includes generating a maintenance schedule based on the health statuses of the vehicle components.

In accordance with another embodiment, a method for scheduling vehicles includes gathering data on real-world conditions to generate monitored data; predicting future real-world conditions to generate predicted data; generating a master schedule for scheduling vehicle operations based on the monitored data and the predicted data; and operating vehicles according to the master schedule. In an embodiment, the method further includes sending the master schedule to a fleet controller, the fleet controller controlling the operation of the vehicles according to the master schedule. In an embodiment, gathering data includes gathering demand data, operations data, environment data, external constrains, maintenance data, and vehicle data. In an embodiment, gathering data includes gathering data from sensors in the vehicles. In an embodiment, predicting the future real-world conditions includes predicting demand, fleet performance, and maintenance. In an embodiment, a goal-seeking algorithm generates the master schedule based on the monitored data, the predicted data, user-defined constraints, and user-defined parameters. In an embodiment, the goal-seeking algorithm moves from a deterministic model to a stochastic model as the monitored data and the predicted data are generated.

In accordance with yet another embodiment, a fleet management system includes a plurality of vehicles; a fleet scheduler, the fleet scheduler including a monitoring layer for gathering data representing real-world conditions; a prediction layer for generating and maintaining predictive models based on the real-world conditions; and a scheduling layer for generating a master schedule based on the real-world conditions and the predictive models; and a fleet controller for executing the master schedule by controlling movement of the plurality of vehicles. In an embodiment, the vehicles include unmanned aerial vehicles. In an embodiment, the vehicles include sensors for detecting health of components in the vehicles. In an embodiment, the master schedule includes schedules for positions of the vehicles, flights of the vehicles, and maintenance of the vehicles. In an embodiment, the monitoring layer is configured to communicate with an unmanned aircraft system traffic management program. In an embodiment, the scheduling layer updates the master schedule based on the real-world conditions and the predictive models in real-time. In an embodiment, the prediction layer is configured to predict demand, and the scheduling layer is configured to schedule the vehicles to move to staging locations based on the predicted demand.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A fleet scheduler comprising:
a processor; and
a non-transitory computer-readable storage medium storing a program to be executed by the processor, the program including instructions for:
providing a user-defined constraint, the user-defined constraint comprising a total number of vehicles, a minimum number of active vehicles, a maximum wait time, or a minimum surplus energy requirement to complete a flight;
providing a user-defined parameter, the user-defined parameter being configured to weight a goal-seeking algorithm that initially uses decision trees that avoid considering randomness;
gathering monitored data representing real-world conditions, wherein the gathering the monitored data comprises at least receiving, from one or more vehicles, vehicle data received during operation of the respective one or more vehicles;

retrieving, for each vehicle of the one or vehicles, vehicle maintenance data associated with maintenance requirements and previously performed maintenance;

generating and maintaining predictive models based on the monitored data and the vehicle data, wherein the predictive models generate predicted data;

generating a master schedule for a plurality of vehicles based on the monitored data and the predicted data, wherein the master schedule optimizes a goal based on the user-defined constraint, the user-defined parameter, wherein each of the vehicles of the plurality of vehicles comprises one or more connected components, wherein the vehicle data comprises tracking data for both the vehicles of the plurality of vehicles and the connected components, wherein the master schedule includes data indicating one or more scheduled vehicle positions, one or more flight plans, and one or more maintenance schedules, and one or more service schedules associated with least one of recharging or refueling of a vehicle, and wherein the generating the master schedule comprises generating the one or more flight plans according to data from a UAF (unmanned aircraft systems) traffic management (UTM) system indicating approved flight corridors and restricted airspace, wherein the generating the master schedule further comprises generating the one or more maintenance schedules with sequenced schedules that maintain the minimum number of active vehicles and according to cycle times for performing maintenance work orders, cycle times between required maintenance, cycle times for technicians performing work orders, numbers of available technicians, and available replacement components;

modifying one or more of the one or more flight plans according to data from the UTM system indicating flight plan data for external vehicles, wherein the modifying the one or more of the one or more flight plans comprises adjusting the one or more flight plans to avoid conflicting with flight plan data for the external vehicles;

controlling one or more vehicles of the plurality of vehicles according to the master schedule, wherein controlling the one or more vehicles according to the master schedule comprises sending the master schedule to a fleet controller, the master schedule causing the fleet controller to generate commands according to the master schedule, and to send the commands to one or more vehicles of the plurality of vehicles, and wherein each maintenance schedule of the one or more maintenance schedules causes the fleet controller to generate commands for routing a respective vehicle to a maintenance facility;

receiving, through the fleet controller, operational data sent from one or more vehicles of the plurality of vehicles;

generating updated predicted data by updating the predictive models based on at least the operational data;

generating an updated goal seeking algorithm according to the operational data and the updated predicted data, wherein the updated goal-seeking algorithm uses stochastic models that consider real world randomness for goal-seeking;

generating an updated master schedule by updating the master schedule according to at least the operational data, the updated predicted data, and the updated goal seeking algorithm; and controlling one or more vehicles of the plurality of vehicles according to the updated master schedule, wherein controlling the one or more vehicles according to the updated master schedule comprises sending the updated master schedule to the fleet controller.

2. The fleet scheduler of claim 1, wherein the master schedule includes schedules for positions of the vehicles.

3. The fleet scheduler of claim 1, wherein generating the master schedule comprises:
establishing a mission to be completed;
generating one or more flight plans to complete the mission; and
selecting a preferred flight plan from the one or more flight plans.

4. The fleet scheduler of claim 3, wherein the mission comprises a priority, wherein generating the master schedule further comprises ordering the mission according to the priority.

5. The fleet scheduler of claim 1, wherein the program further includes instructions for:
receiving, from the fleet controller, first data related to deviations from the master schedule, wherein the first data is related to deviations from the master schedule made according to the UTM system; and
wherein the instructions for generating an updated master schedule by updating the master schedule according to at least the operational data include instructions for updating the master schedule in real-time according to the first data and the operational data.

6. The fleet scheduler of claim 1, wherein each of the connected components of the one or more connected components comprises a sensor, wherein gathering the monitored data representing real-world conditions comprises gathering connected component wear data from the sensors of the one or more connected components indicating health statuses of the one or more connected components associated with degradation of the connected components, wherein generating the master schedule comprises generating the one or more maintenance schedules based on the health statuses of the one or more connected components.

7. A method for controlling a fleet of autonomous vehicles, the method comprising:
generating vehicle data in a fleet of autonomous vehicles, wherein each of the autonomous vehicles comprises a plurality of connected components, wherein each of the connected components comprises a sensor, wherein the sensor generates connected component wear data included in the vehicle data, and wherein the vehicle data comprises data generated during operation of one or more vehicles of the fleet of autonomous vehicles;
retrieving, for each vehicle of the one or vehicles, vehicle maintenance data associated with maintenance requirements and previously performed maintenance;
receiving, by a fleet scheduler, data associated with real-world conditions to generate monitored data, the monitored data comprising demand data, operations data, environment data, external constraints, maintenance data, and the vehicle data;
generating predicted data by the fleet scheduler by predicting future real-world conditions, the predicted data comprising predicted demand, predicted fleet performance, and predicted maintenance, wherein the predicted maintenance uses machine learning to analyze the connected component wear data and predict when the connected components will fail;

generating a master schedule, by the fleet scheduler, for scheduling vehicle operations based on the monitored data, the vehicle maintenance data for each vehicle, and the vehicle data and the predicted data, wherein the master schedule includes data indicating one or more scheduled vehicle positions, one or more flight plans, one or more maintenance schedules and one or more service schedules associated with least one of recharging or refueling of a vehicle, and wherein the generating the master schedule comprises generating the one or more flight plans according to data from a UAF (unmanned aircraft systems) traffic management (UTM) system indicating approved flight corridors and restricted airspace, wherein the generating the master schedule further comprises generating the one or more maintenance schedules with sequenced schedules that maintain the minimum number of active vehicles and according to cycle times for performing maintenance work orders, cycle times between required maintenance, cycle times for technicians performing work orders, numbers of available technicians, and available replacement components;

modifying one or more of the one or more flight plans according to data from the UTM system indicating flight plan data for external vehicles, wherein the modifying the one or more of the one or more flight plans comprises adjusting the one or more flight plans to avoid conflicting with flight plan data for the external vehicles;

operating the fleet of autonomous vehicles, by a fleet controller, according to the master schedule by controlling one or more vehicles of the fleet of vehicles according to the master schedule, wherein controlling the one or more vehicles according to the master schedule comprises sending the master schedule to a fleet controller, the master schedule causing the fleet controller to generate commands according to the master schedule, and to send the commands to one or more vehicles of the fleet of autonomous vehicles, wherein each maintenance schedule of the one or more maintenance schedules causes the fleet controller to generate commands for routing a respective vehicle to a maintenance facility, wherein the fleet controller sends the commands to the one or more vehicles of the fleet of autonomous vehicles through an internet-of-things backbone;

receiving, by the fleet scheduler, through the fleet controller, operational data sent from one or more vehicles of the fleet of vehicles;

generating updated predicted data by updating the predictive data based on at least the operational data;

generating an updated goal seeking algorithm according to the operational data and the updated predicted data, wherein the updated goal-seeking algorithm uses stochastic models that consider real world randomness for goal-seeking;

generating an updated master schedule by updating the master schedule according to at least the operational data, the updated predicted data, and the updated goal seeking algorithm; and controlling one or more vehicles of the fleet of vehicles according to the updated master schedule, wherein controlling the one or more vehicles according to the updated master schedule comprises sending the updated master schedule to the fleet controller.

8. The method of claim 7, wherein a goal-seeking algorithm generates the master schedule based on the monitored data, the predicted data, user-defined constraints, and user-defined parameters.

9. The method of claim 8, wherein the goal-seeking algorithm moves from a deterministic model to a stochastic model as the monitored data and the predicted data are generated.

10. The method of claim 7, further comprising updating the master schedule to include third party requests submitted directly to the master schedule.

11. The method of claim 7, wherein at startup, the fleet scheduler generates the master schedule based on user-generated pre-determined decision trees.

12. The method of claim 7, further comprising:
providing a user-defined constraint, the user-defined constraint comprising a total number of vehicles, a minimum number of active vehicles, a maximum wait times, or a minimum surplus energy requirement to complete a flight;
providing a user-defined parameter, the user-defined parameter being configured to weight a goal-seeking algorithm;
generating a plurality of missions to be completed by the fleet of autonomous vehicles based on the monitored data and the predicted data;
generating a plurality of potential flights that could be used to complete each of the missions; and
selecting a flight plan for each mission based on the user-defined constraint, the user-defined parameter, the monitored data, and the predicted data.

13. A fleet management system comprising:
a plurality of vehicles, each of the vehicles including one or more connected components, each of the connected components comprising one or more sensors;
a fleet scheduler, the fleet scheduler comprising:
a monitoring layer configured for gathering monitored data representing real-world conditions, the monitored data comprising vehicle data, the vehicle data comprising data generated from the one or more sensors during operation of one or more vehicles of the plurality of vehicles;
a prediction layer configured for:
retrieving, for each vehicle of the plurality of vehicles, vehicle maintenance data associated with maintenance requirements and previously performed maintenance;
generating and maintaining predictive models based on at least the real-world conditions and the vehicle data, wherein the prediction layer generates predicted data according to the predictive models; and
a scheduling layer configured for:
generating a master schedule based on the monitored data and the predicted data, wherein at startup, the monitored data and the predicted data are unpopulated and the scheduling layer generates the master schedule based on a user-defined decision tree and a plurality of user-defined parameters, and wherein the master schedule includes data indicating one or more scheduled vehicle positions, one or more flight plans, one or more maintenance schedules and one or more service schedules associated with least one of recharging or refueling of a vehicle, and wherein the generating the master schedule comprises generating the one or more flight plans according to data from a UAF (unmanned aircraft systems) traffic management (UTM) system indicating approved flight corridors and restricted airspace, wherein the generating the master schedule further comprises generating the one or more maintenance schedules with sequenced schedules that maintain the minimum number of active vehicles and according to cycle times for performing maintenance work orders, cycle times between required maintenance, cycle times for technicians performing work orders, numbers of available technicians, and available replacement components; and modifying one or more of the one or more flight plans according to data from the UTM system indicating flight plan data for external vehicles, wherein the modifying the one or more of the one or more flight plans comprises adjusting the one or more flight plans to avoid conflicting with flight plan data for the external vehicles;

wherein the fleet scheduler is configured for controlling one or more vehicles of the plurality of vehicles according to the master schedule, wherein controlling the one or more vehicles according to the master schedule comprises sending the master schedule to a fleet controller; and a fleet controller configured for:
generating commands according to the master schedule, and for, the generating the commands comprising generating commands for routing a respective vehicle to a maintenance facility according to each maintenance schedule of the one or more maintenance schedules;
controlling movement of one or more vehicles of the plurality of vehicles by sending the commands to one or more vehicles of the plurality of vehicles;
receiving operational data from one or more vehicles of the plurality of vehicles; and
sending the operational data to the fleet scheduler;

wherein the fleet scheduler is further configured for:
receiving, through the fleet controller, the operational data;
generating updated predicted data by updating the predictive models based on at least the operational data;
generating an updated goal seeking algorithm according to the operational data and the updated predicted data, wherein the updated goal-seeking algorithm uses stochastic models that consider real world randomness for goal-seeking;
generating an updated master schedule by updating the master schedule according to at least the operational data, the updated predicted data, and the updated goal seeking algorithm; and
controlling one or more vehicles of the plurality of vehicles according to the updated master schedule, wherein controlling the one or more vehicles according to the updated master schedule comprises sending the updated master schedule to the fleet controller.

14. The fleet management system of claim 13, wherein the vehicles comprise unmanned aerial vehicles.

15. The fleet management system of claim 13, wherein the sensors detect health of the connected components in the vehicles.

16. The fleet management system of claim 13, wherein the master schedule comprises schedules for positions of the vehicles.

17. The fleet management system of claim 13, wherein the monitoring layer is configured to communicate with an unmanned aircraft system traffic management program.

18. The fleet management system of claim 13, wherein the scheduling layer updates the master schedule based on the real-world conditions and the predictive models in real-time.

19. The fleet management system of claim 13, wherein the prediction layer is configured to predict demand, and wherein the scheduling layer is configured to schedule the vehicles to move to staging locations based on the predicted demand.

* * * * *

UNITED STATES PATENT AND TRADEMARK OFFICE
CERTIFICATE OF CORRECTION

| | | |
|---|---|---|
| PATENT NO. | : 11,734,623 B2 | |
| APPLICATION NO. | : 16/721132 | |
| DATED | : August 22, 2023 | |
| INVENTOR(S) | : Grant Mark Bristow et al. | |

It is certified that error appears in the above-identified patent and that said Letters Patent is hereby corrected as shown below:

In the Specification

Column 7, Line 64; delete "UAF" and insert --UAS--.

Column 15, Line 28; delete "UAF" and insert --UAS--.

Column 17, Line 16; delete "UAF" and insert --UAS--.

Column 19, Line 3; delete "UAF" and insert --UAS--.

Signed and Sealed this
Fifth Day of March, 2024

Katherine Kelly Vidal
*Director of the United States Patent and Trademark Office*